US006349163B1

(12) United States Patent
Antos et al.

(10) Patent No.: US 6,349,163 B1
(45) Date of Patent: *Feb. 19, 2002

(54) DISPERSION COMPENSATING SINGLE MODE WAVEGUIDE

(75) Inventors: A. Joseph Antos, Elmira; George E. Berkey, Pine City; Daniel W. Hawtof; G. Thomas Holmes, both of Painted Post; Yanming Liu, Horseheads, all of NY (US)

(73) Assignee: Corning Incorporated, Corning, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/435,735

(22) Filed: Nov. 8, 1999

Related U.S. Application Data (63) Continuation of application No. 08/973,794, filed on Dec. 10, 1997, now Pat. No. 5,999,679.
(60) Provisional application No. 60/023,297, filed on Jul. 31, 1996.

(51) Int. Cl.⁷ .................................. G02B 6/02
(52) U.S. Cl. ........................................ 385/127
(58) Field of Search ................... 385/123, 126, 385/127, 128

(56) References Cited

U.S. PATENT DOCUMENTS

| 4,715,679 A | 12/1987 | Bhagavatula | 350/96.33 |
| 4,755,022 A | 7/1988 | Ohashi et al. | 350/96.33 |
| 4,778,244 A | 10/1988 | Ryan | 350/96.23 |
| 5,261,016 A | 11/1993 | Poole | 385/28 |
| 5,361,319 A | 11/1994 | Antos et al. | 385/123 |
| 5,448,674 A | 9/1995 | Vengsarkar et al. | 385/123 |
| 5,488,674 A | 1/1996 | Burt et al. | 385/123 |
| 5,553,185 A | 9/1996 | Antos et al. | 385/127 |
| 5,555,340 A | 9/1996 | Onishi et al. | 385/127 |
| 5,568,583 A | 10/1996 | Akasaka et al. | 385/123 |
| 5,740,297 A | 4/1998 | Onishi et al. | 385/127 |
| 5,742,723 A | 4/1998 | Onishi et al. | 385/127 |
| 5,838,867 A | 11/1998 | Onishi et al. | 385/123 |
| 5,887,104 A | 3/1999 | Sugizaki et al. | 385/123 |
| 6,031,956 A | * | 2/2000 | Li et al. | 385/124 |

FOREIGN PATENT DOCUMENTS

| EP | 0 598 554 A1 | 5/1994 | |
| EP | 0 674 193 A2 | 9/1995 | |
| GB | 2 138 429 A | 10/1984 | C08J/7/08 |
| JP | 63-182618 | 7/1988 | |
| JP | 63-225562 | 9/1988 | |
| JP | 7-230015 | 8/1995 | |
| JP | 7-258142 | 10/1995 | |

OTHER PUBLICATIONS

"Recent Progress in Dispersion Compensating Fibers", Applied Physics, vol. 64, No. 1, Jan. 10, 1995.
"Design of Dispersion Compensating Fiber and Moduling Technique", Technical Report of IEICE (The Institute of Electronics, Information and Communication Engineers, vol. 95 and 96; Jun. 18, 1995.

(List continued on next page.)

*Primary Examiner*—Hung N. Ngo
(74) *Attorney, Agent, or Firm*—Robert L. Carlson; William J. Chervenak (57) ABSTRACT

A dispersion compensating single mode optical waveguide fiber designed to change the wavelength window of operation of a link from 1310 nm to 1550 nm. The dispersion compensating waveguide fiber is characterized by a core glass region refractive index profile comprised of at least three segments. The segment on the waveguide center has a positive relative refractive index. At least one segment, spaced apart from, the waveguide centerline has a negative relative refractive.

12 Claims, 4 Drawing Sheets

OTHER PUBLICATIONS

M. Kakui et al., "2.4 Gbit/s, 306–km Repeaterless Transmission by Using a Directly Modulated DFB–LD and Dispersion–Compensating Fiber", Optical Fiber Communication. Summaries of Papers Presented at the Conference OFC '95, San Diego, Feb. 26–Mar. 3, 1995, pg. 148–149.

V. A. Semenov et al., "Broadband Dispersion–Compensating Fiber for High–Bit–Rate Transmission Network Use", Aug. 20, 1995, Applied Optics, vol. 34, No. 24, pgs. 5331–5337.

R. W. Tkach et al., "Transmission of Eight 20–Gb/s Channels Over 232 km of Conventional Single–Mode Fiber", Nov. 7, 1995, IEEE Photonics Technology Letters, No. 11, New York, US, pgs. 1369–1371.

* cited by examiner

DISPERSION COMPENSATING SINGLE MODE WAVEGUIDE

This is a continuation of application Ser. No. 08/973,794, filed Dec. 10, 1997, now U.S. Pat. No. 5,999,679 which claims the benefit of PCT Application No. PCT/US97/12136, filed Jul. 14, 1997, which claims the benefit of U.S. Provisional Serial No. 60/023,297, filed Jul. 31, 1996.

BACKGROUND OF THE INVENTION

The invention is directed to a single mode optical waveguide fiber having controlled negative total dispersion and a relatively large effective area. In particular, the single mode waveguide has a total dispersion which is less than—100 ps/nm-km.

Several factors have combined to make the wavelength range, 1500 nm to 1600 nm, most preferred for telecommunication systems incorporating optical waveguide fiber. These are:

the availability of reliable lasers in the wavelength window around 1550 nm;

the invention of the optical fiber amplifier having an optimum gain curve in the wavelength range 1530 nm to 1570 nm;

the availability of systems capable of wavelength division multiplexing of signals in this wavelength range; and, the availability of waveguide fibers having a low dispersion to compliment the very low attenuation over this wavelength range.

These advances in technology make possible very high information rate, multi-channel telecommunication systems which have a large spacing between stations where the signal is electronically regenerated.

However, many telecommunication systems installations pre-date the technological advances which make 1550 nm the most preferred operating window. These earlier systems were designed primarily for use over a wavelength range centered near 1310 nm. The design includes lasers which operate at wavelengths near 1310 nm and optical waveguides which have a zero dispersion wavelength near 1310 nm. The waveguide fiber, in these systems, does have a local attenuation minimum near 1310 nm, but the theoretical minimum at 1550 nm is about half that at 1310 nm.

A strategy has been developed to make these older systems compatible with the new laser, amplifier, and multiplex technology. As disclosed in U.S. Pat. No. 5,361,319, Antos et al., ('319, Antos) and discussed further in the references noted therein, an essential feature of this strategy is to overcome the relatively high total dispersion by inserting into each waveguide fiber link a length of waveguide fiber which compensates for the total dispersion of the link at 1550 nm. The term "link" used herein is defined as the length of waveguide fiber which spans the distance between a signal source, i.e., a transmitter or an electronic signal regenerator, and a receiver or another electronic signal regenerator.

The '319, Antos patent recites a dispersion compensating waveguide fiber having a core refractive index profile which provides a dispersion at 1550 nm of about −20 ps/nm-km. The dispersion sign convention common in the art is that a waveguide dispersion is said to be positive if shorter wavelength light has a higher speed in the waveguide. Because the dispersion at about 1550 nm of a waveguide fiber, having a zero dispersion wavelength near 1310 nm, is about 15 ps/nm-km, the length of dispersion compensating waveguide fiber required to fully compensate for total dispersion at 1550 nm is 0.75 of the original link length. Thus, for example, a 50 km link of waveguide fiber has a total dispersion at 1550 nm of 15 ps/nm-km×50 km=750 ps/nm. To effectively cancel this dispersion, a length of dispersion compensating waveguide fiber of 750 ps/nm÷20 ps/nm-km=32.5 km is required.

The additional attenuation introduced into the link by the dispersion compensating waveguide would have to be offset by means of an optical amplifier. The introduction of additional electronic regenerators into the link would not be cost effective. Further, the cost of the dispersion compensating waveguide fiber is a significant fraction of the total waveguide fiber cost. The long lengths of dispersion compensating waveguide required must be formed into an environmentally stable package which can take up considerable space.

Because the compensating waveguide fiber design usually has more refractive index modifying dopant in the core region, the attenuation is, in general, higher relative to the standard waveguide fiber in a link.

The higher signal power level, made possible by improved lasers and by optical amplifiers, as well as wavelength division multiplexing, increases the possibility that link length or data transmission rate may be limited by non-linear optical effects. The impact of these non-linear effects can be limited by increasing the effective area ($A_{eff}$) of the fiber. The effective area is $A_{eff}=2\pi(\int E^2 r\, dr)^2/(\int E^4 r\, dr)$, where the integration limits are 0 to $\infty$, and E is the electric field associated with the propagated light. The distortion due to non-linear effects depends upon a term of the form, $P \times n_2/A_{eff}$, where P is the signal power, and, $n_2$ is the non-linear index constant. Thus, in the design of a dispersion compensating waveguide fiber, care must be taken to insure that $A_{eff}$ of the compensating fiber is large enough so that the compensation fiber does not cause significant non-linear effects in the link. If $A_{eff}$ of the compensating fiber is smaller than that of the original fiber in the link, the compensating fiber may be placed at a link location where signal power is lower and thus non-linear effects minimum. Also, in many links the smaller $A_{eff}$ compensating fiber is a small fraction of the overall link length and so does not contribute significantly to non-linear distortion of the signal.

Thus, there is a need for a dispersion compensating optical waveguide fiber:

having a length which is a small fraction, e.g., less than 15%, of the link length;

which is sufficiently low in attenuation to eliminate the need for additional signal amplification solely to offset the compensating waveguide fiber attenuation; and, which has an effective area sufficiently large to preclude non-linear dispersive effects in the compensating waveguide fiber from being a limiting factor.

DEFINITION

The effective area is $A_{eff}=2\pi(\int E^2 r\, dr)^2/(\int E^4 r\, dr)$, where the integration limits are 0 to $\infty$, and E is the electric field associated with the propagated light.

The non-linear discriminator factor is defined by the equation $G_{nl}=n_2/A_{eff}(\exp[D_1 \times L_1/D_d/\alpha]-1)/\alpha$, where $n_2$ is the non-linear refraction coefficient, $D_1$ is the dispersion of the portion of the waveguide optimized for operation around 1310 nm, $L_1$ is the length corresponding to $D_1$, $D_d$ is the dispersion of the compensating waveguide fiber and a $\alpha$ the attenuation of the dispersion compensating fiber. This expression for $G_{nl}$ derives from a base definition $G_{nl}$~$n_2/$ $A_{eff}$(Effective length×Output Power). The effective length and output power are expressed in terms of waveguide fiber length and attenuation, α. The compensating waveguide fiber is introduced into the equation via the requirement $D_1 \times L_1 = D_d \times L_d$. $G_{nl}$ is a useful quantity in evaluating the efficiency of a link because it is a combination of system factors such as system architecture, amplifier spacing, $D_d/\alpha$, and, $n_2/A_{eff}$.

SUMMARY OF THE INVENTION

The invention disclosed herein meets the requirements for an improved dispersion compensating waveguide fiber. A species of the genus of segmented core refractive index profiles, introduced in U.S. Pat. No. 4,715,679, Bhagavatula and in U.S. patent application Ser. No. 08/378,780, Liu, has been discovered which are uniquely suited for dispersion compensating waveguide fiber.

A first aspect of the invention is a single mode optical waveguide fiber having a central core glass region and a surrounding layer of clad glass. The core glass region has at least three segments, each of which is characterized by a refractive index profile, a radius, r, and a Δ%. The definition of the % index delta is % $\Delta = [(n_1^2 - n_c^2)/2n_1^2] \times 100$, where $n_1$ is a core index and $n_c$ is the clad index. Unless otherwise stated, $n_1$ is the maximum refractive index in the core region characterized by a % Δ. The radius of each segment is measured from the centerline of the waveguide fiber to the point of the segment farthest from the centerline. The refractive index profile of a segment gives the refractive index value at the radial points of that segment. In this first aspect of the invention, $\Delta_1$ %, the delta percent of the first segment, is positive and the Δ % of at least one other segment is negative. The radii and Δ %'s of the segments are chosen to provide a negative total dispersion at 1550 nm which is no greater than −150 ps/nm-km.

In an embodiment of this first aspect, the core glass region has three segments and the second segment has a negative Δ %. A preferred embodiment has respective segments, beginning at the first segment and proceeding outwardly, having radii in the ranges of about 1 to 1.5 μm, 5.5 to 6.5 μm, and, 8 to 9.5 μm, and, the respective segments, beginning at the first segment and proceeding outwardly, having Δ %'s in the ranges of about 1.5 to 2%, −0.2 to −0.5%, and, 0.2 to 0.5 to provide an effective area, $A_{eff}$, at 1550 nm, no less than about 30 μm². Effective areas higher than 60 μm² are achievable.

In another embodiment of this first aspect, the core glass region has four segments, and the second and fourth segments have a negative Δ %. A preferred embodiment has respective radii, beginning at the waveguide center and proceeding outward, in the ranges of about 1 to 2 μm, 6 to 8 μm, 9 to 11 μm, and, 13 to 17 μm. The corresponding segment Δ %'s are in the respective ranges of about 1 to 2%, −0.2 to −0.8%, 0.4 to 0.6%, and −0.2 to −0.8%. These preferred core profiles provide $A_{eff}$ at 1550 nm of no less than 30 μm². The dispersion slope of 2 to 15 ps/nm-km provided by these core profiles is reasonably small.

In another embodiment of this aspect of the invention, the core glass region has four segments, numbered 1 to 4, beginning at the waveguide fiber center. The corresponding relative refractive index percent of the segments are ordered as $\Delta_1 \% > \Delta_3 \% > \Delta_4 \% > \Delta_2 \%$, where $\Delta_2$ % is negative. The respective Δ %'s are, 1.5 to 2% for $\Delta_1$ %, −0.2 to −0.45% for $\Delta_2$ %, 0.25 to 0.45 % for $\Delta_3$ %, and, 0.05 to 0.25% for $\Delta_4$ %, and the respective radii associated with these Δ%'s are in the ranges of about 0.75 to 1.5 μm for $r_1$, 4.5 to 5.5 μm for $r_2$, 7 to 8 μm for $r_3$, and, 9 to 12 μm. In this embodiment, the total dispersion slope is negative which serves to cancel with the positive slope of the waveguide fiber of the original link operating in the 1310 nm window. Typically, the negative slope of the total dispersion is in the range of about −0.1 to −5.0 ps/nm²-km.

A second aspect of the invention is a single mode optical waveguide fiber link made of a first length of single mode fiber designed for operation in the 1310 nm window and a length of dispersion compensating single mode waveguide fiber. The dispersion compensating fiber length and total dispersion product at 1550 nm are chosen to add algebraically with the length times dispersion product of the first length of waveguide fiber to produce a pre-selected value of total dispersion for the link. The pre-selected value may advantageously be chosen zero at 1550 nm to provide the lowest total dispersion over this window. If four wave mixing or self phase modulation is an anticipated problem for 1550 nm window operation, the total dispersion at 1550 nm may be selected to be a small positive number.

The attenuation of the dispersion compensating waveguide fiber is held to a low value so that attenuation does not become a data rate limiter for the link. In addition, $A_{eff}$ should be large enough, at least 30 μm², so that significant non-linear dispersive effects are not introduced by the dispersion compensating waveguide fiber. The ratio of the compensating fiber total dispersion and attenuation, together with $A_{eff}$ are combined in a function which describes a discriminating factor, denoted $G_{nl}$ in the art and defined above, which is a measure of the properties of the compensating waveguide fiber with regard to non-linear dispersive effects.

An embodiment of this aspect of the invention includes a dispersion compensating waveguide fiber which has a total dispersion, $D_d$ no greater than −150 ps/nm-km, $A_{eff} \geq 30$ μm², and the magnitude of $D_d/\alpha \geq 150$ ps/nm-dB. In a preferred embodiment, the magnitude of $D_d/\alpha$ is ≥250 ps/nm-dB.

Because the total dispersion of the compensating fiber is a large negative number, the length of compensating fiber required to arrive at a pre-selected value of total dispersion for the link is generally less than 15% of the link length and may be less than 5% of the link length.

A third aspect of the invention is a method of making a single mode optical waveguide which compensates at 1550 nm for dispersion in a link originally designed for operation in the 1310 nm window. The draw preform, comprising a central core glass region and a surrounding clad glass layer, the core glass region having the properties described in the first aspect of the invention, may be made by any of several techniques in the art. These include, inside and outside chemical vapor deposition, axial chemical vapor deposition and any of the modifications of these techniques in the art. The core regions having positive relative refractive index may be formed using a dopant such as germania in a silica glass matrix. The core regions of negative relative index may be formed using a dopant such as fluorine.

A drawing tension greater than about 100 grams has been found to yield better total dispersion to attenuation ratios than similar waveguide fibers drawn at lower tension. To limit loss due to bending, an outside diameter greater than about 125 μm is preferred. The upper limit on outside diameter is set by practical limitations such as cost and required cable size. A practical upper limit is about 170 μm.

To limit attenuation due to residual coating stress, the coated waveguide fiber may be loose wrapped on a spool and heat treated. For most effective stress relief, the spool size should be greater than about 45 cm. The winding tension used to wrap the waveguide fiber onto the spool is less than about 20 grams. A preferred winding method is one in which the waveguide fiber is allowed to assume a catenary configuration just prior to being wound onto the spool.

A heat treatment at a temperature at least 30° C. greater than the glass transition temperature, $T_g$, of the polymer coating and continued for 1 to 10 hours has been found effective to relieve residual coating stresses for the coating types and thicknesses used in testing. A holding time of about 5 hours was found to be effective for the thickness, about 60 μm, of UV cured acrylate coating used in the manufacture of the waveguide fiber described herein.

It is understood that the heat treating method recited herein includes temperature and time limitations suited to any of the several polymer coatings types and thicknesses suitable for use in the manufacture of optical waveguide fiber.

DETAILED DESCRIPTION OF THE INVENTION

The wide applicability of segmented core waveguide fiber designs to particular telecommunication system requirements derives from the flexibility provided by the segmented core concept. The number of core segments is limited only by the core diameter and the narrowest core segment which can affect the propagation of light in a waveguide. Also, it is known that the width, placement, refractive index profile, and the relative location of the core segments, with reference, for example, to the waveguide long axis centerline, affect the properties of the segmented core waveguide fiber. The large number of permutations and combinations of the segments accounts for the flexibility of the segmented core design.

The problem solved by the invention, disclosed and described herein, is that of upgrading a telecommunication system, designed for operation in the 1310 nm window, to operate in the 1550 nm wavelength window, without resorting to a major overhaul of the system. The solution to this problem is a dispersion compensating waveguide fiber which can be readily inserted into a communications link and which has a total dispersion characteristic, an attenuation, and, an $A_{eff}$ to allow high data rate transmission in the operating window around 1550 nm. In particular, the compensating fiber must have a dispersion characteristic which essentially cancels 1550 nm window dispersion of the 1310 nm section of the link. The compensating fiber should have an attenuation low enough to allow insertion, into the link, of the compensating fiber without causing a need for signal regeneration. In some case optical amplification of the signal may be required. The $A_{eff}$ of the compensating fiber should be large enough that the compensating fiber does not become the data rate limiting component with regard to non-linear effects.

Figure 1:
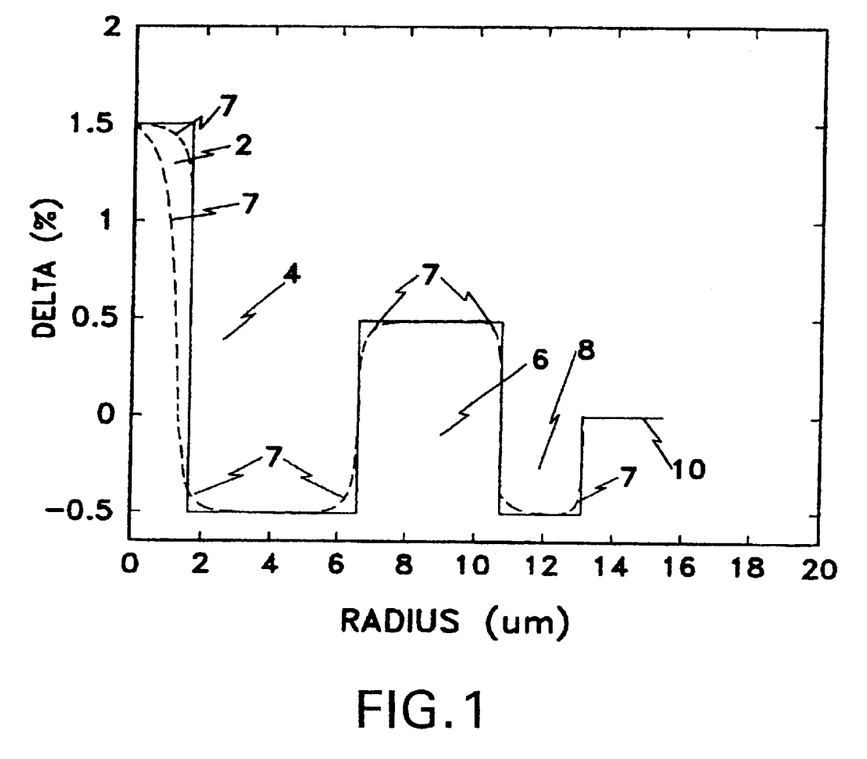
FIG. 1 is a general illustration of the novel core region refractive index profile.

A general core region refractive index profile which meets these requirements is shown in FIG. 1. Four segments, 2, 4, 6, and 8, are shown in the illustration. In one embodiment of the invention, segment 8 is equal in refractive index to that of clad 10, so that the core glass region has three segments. The invention is not limited to three or four segment core refractive index profiles. However, in terms of manufacturing cost, the simplest profile which meets the system requirements is preferred.

Dashed lines 7 indicate alterations which can be made in the segment index profiles without substantially changing the waveguide fiber properties. The corners of the profile may be rounded. The central profile shape may be, for example, triangular or parabolic. Only one segment need have a negative Δ %. An alternative statement of the impact of small profile alterations or perturbations is, the Δ %'s, the widths at the bases, and the outer radii of a segments are more important factors in determining waveguide fiber characteristics.

Table 1. shows a computer model study done to evaluate the sensitivity of waveguide fiber properties to core segment placement and Δ %. Index profiles 1 through 5 follow the FIG. 1 four segment core region refractive index profile illustration. Index profile 6 is a three segment profile which has all the features of FIG. 1 except for the final segment 8.

TABLE 1

|  | Index 1 | Index 2 | Index 3 | Index 4 | Index 5 | Index 6 |
| --- | --- | --- | --- | --- | --- | --- |
| Disp. ps/nm-km | −430 | −549 | −475 | −220 | −310 | −327 |
| Disp. Slope ps/nm²-km | 6.3 | 9.8 | 10.6 | 2.4 | 13.6 | 4.2 |
| $A_{eff}$ μm² | 78 | 104 | 132 | 58 | 208 | 72 |
| Cutoff μm | 2.2 | 2.3 | 1.9 | 2.0 | 1.9 | 1.9 |
| $\Delta_1$ % | 1.5 | 1.5 | 1.45 | 1.5 | 1.5 | 2.0 |
| $r_1$ μm | 1.5 | 1.5 | 1.5 | 1.5 | 1.45 | 1.05 |
| $\Delta_2$ % | −0.5 | −0.5 | −0.5 | −0.5 | −0.5 | −0.3 |
| $r_2$ μm | 6.5 | 7 | 8 | 5.8 | 8 | 6 |
| $\Delta_3$ % | 0.5 | 0.5 | 0.5 | 0.6 | 0.6 | 0.35 |
| $r_3$ μm | 10.5 | 11 | 11 | 9 | 11 | 8.8 |
| $\Delta_4$ % | −0.5 | −0.5 | −0.5 | −0.5 | −0.5 | 0 |
| $r_4$ μm | 13 | 13 | 17 | 13 | 17 | — |

Several of the advantageous features of the design are shown in Table 1. These are:

very large negative dispersions are achievable together with large $A_{eff}$ for all of the index profiles studied;

the cut off wavelength is relatively insensitive to segment parameter changes;

reducing the radius of segment 2 is effective in reducing the total dispersion slope; and, a three segment core can meet the requirements of many system configurations.

Note also that one may achieve a decreased total dispersion slope, if a system requires a lesser amount of negative total dispersion.

TABLE 2

|  | Index 21 | Index 22 | Index 23 |
|---|---|---|---|
| Disp. ps/nm-km | −310 | −280 | −273 |
| Disp. Slope ps/nm²-km | −0.1 | −2.4 | −1.2 |
| $A_{eff}$ μm² | 25 | 19 | 22 |
| Cut Off μm | 2.0 | 1.9 | 1.9 |
| $\Delta_1$ % | 2.0 | 2.0 | 2.0 |
| $r_1$ μm | 1.1 | 1.1 | 1.1 |
| $\Delta_2$ % | −0.3 | −0.3 | −0.3 |
| $r_2$ μm | 5.5 | 6 | 5.5 |
| $\Delta_3$ % | 0.35 | 0.35 | 0.35 |
| $r_3$ μm | 8 | 8.8 | 8.3 |
| $\Delta_4$ % | 0.1 | 0 | 0 |
| $r_4$ μm | 10 | — | — |

The embodiment of the novel profile illustrated in FIG. 2 again shows a four segment, 12, 14, 16, and 18 core glass region. The clad glass layer is shown as structure 20. The main features of this design are: the central segment relative index is high in comparison to the design of FIG. 1; only one negative relative index portion, 14, is present; and, the radii of segments 14, 16, and 18 are reduced relative to the design illustrated in FIG. 1. One effect of moving the segment locations closer to the waveguide centerline is to reduce $A_{eff}$.

Figure 2:
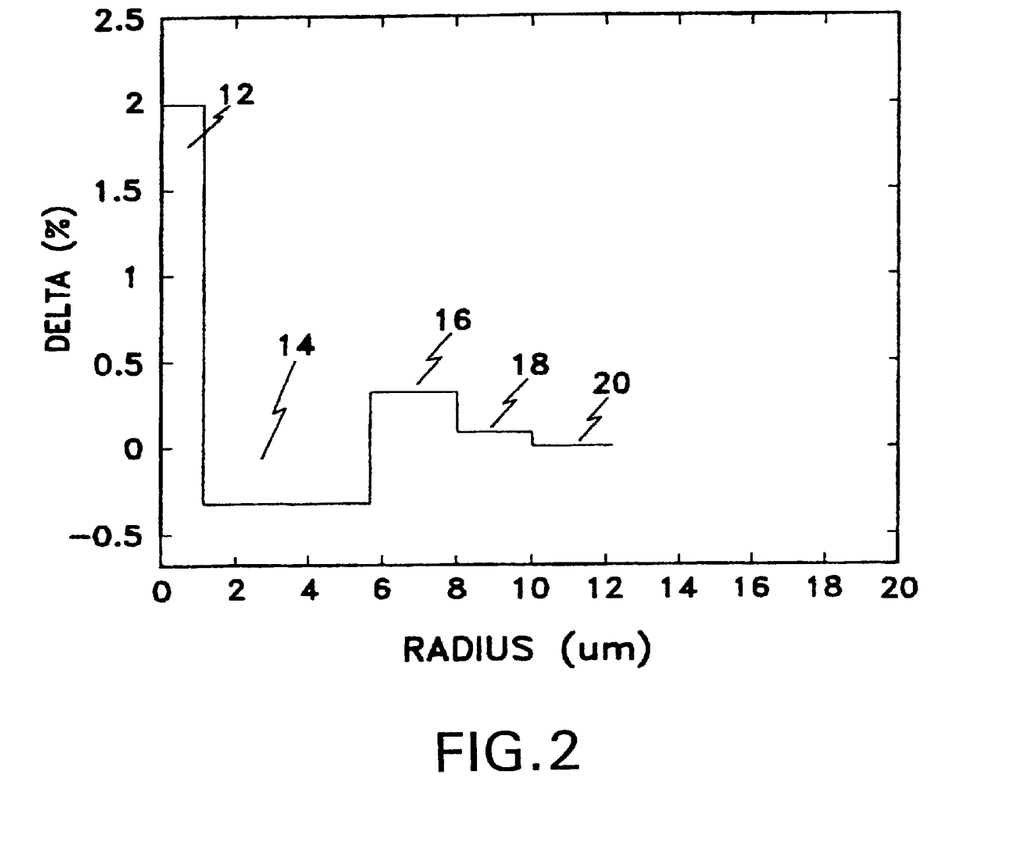
FIG. 2 is a particular embodiment of the novel core region refractive index profile.

The design of the core glass region refractive index profile 21 follows that illustrated in FIG. 2. Index profiles 22 and 23 are similar to the illustration of FIG. 2 except that the Δ % of segment 18 is zero for these two cases. Table 2. shows the results of a computer model study to evaluate the properties of core region index profiles which yield a negative total dispersion slope in the dispersion compensating waveguide fiber. A negative total dispersion slope in the compensating waveguide fiber serves to cancel at least a part of the positive slope of the remainder of the link, thereby lowering the link dispersion slope over the wavelengths of the 1550 nm window of operation. The data in Table 2. indicates that $A_{eff}$ is low when negative dispersion slope is achieved. Thus this compensating waveguide design is to be used in cases where only a short length of compensating fiber is required or where non-linear dispersive effects are not important, such as parts of a link whereat signal power density is low.

EXAMPLE

A Three Segment Profile Having Large $D_d/\alpha$

Figure 3:
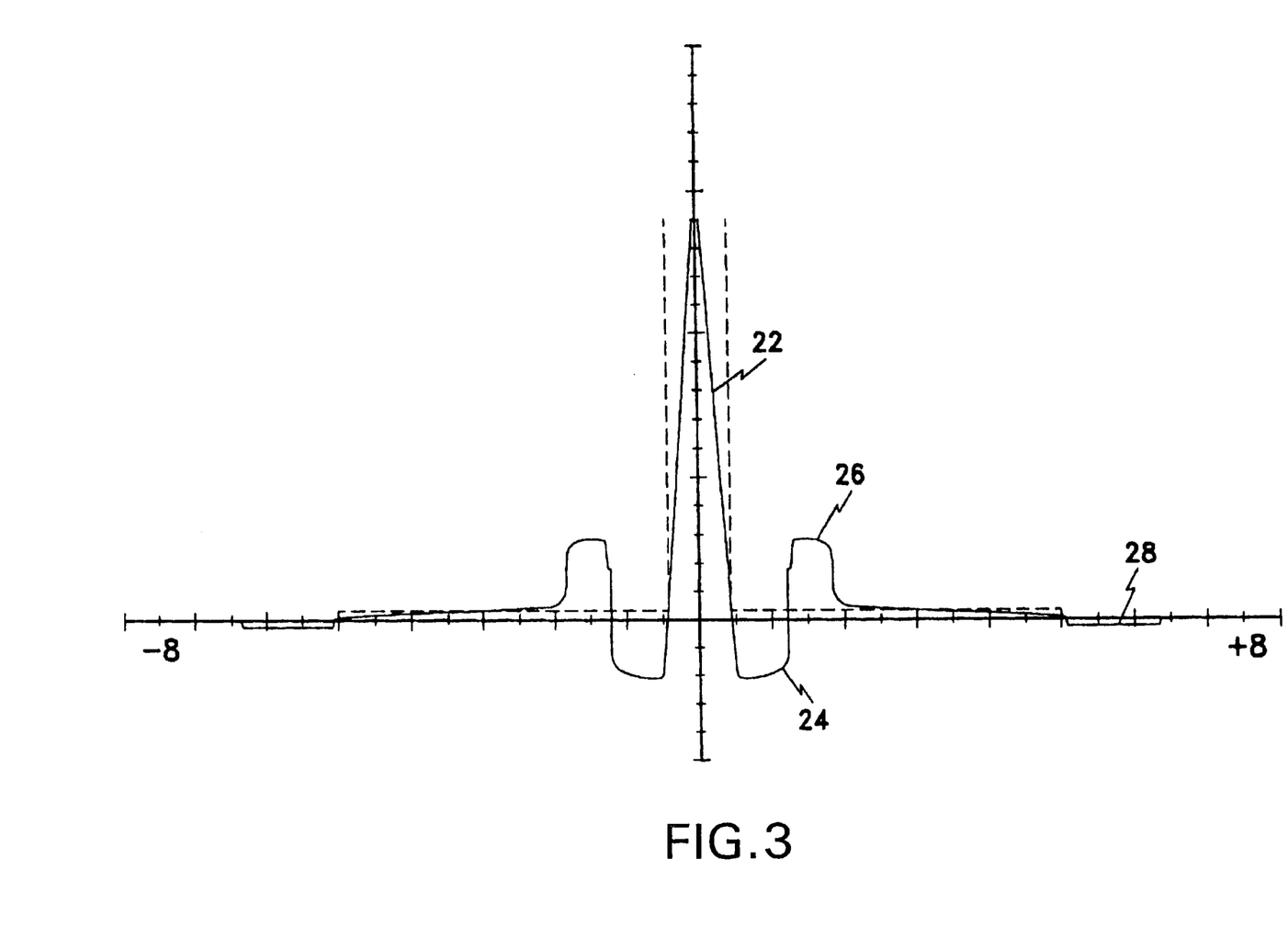
FIG. 3 is a measurement made on a draw preform which incorporates an embodiment of the novel core profile.

An optical waveguide fiber preform was prepared having a three segment core glass region refractive index profile as shown in FIG. 3. Central segment 22 had a Δ % of 1.83. Segment 24 had a negative Δ % of −0.32%. Segment 26 had a relative refractive index of 0.32%. The segment radii may be read in millimeters from the horizontal axis and converted to their waveguide fiber equivalents using the final waveguide fiber outside diameter which was 155 μm. The draw tension averaged about 200 gm. The resulting waveguide fiber was loose wound on 46 mm diameter spool and annealed for about 10 hours at 50° C.

The total dispersion was −214 ps/nm-km and the attenuation was 0.6 dB/km to yield a $D_d/\alpha$ of 356 ps/nm-dB. The effective area was 50 μm². Advantageously, the dispersion slope for waveguides having this core configuration is in the range −2 to +2 ps/nm²-km.

Figure 4A:
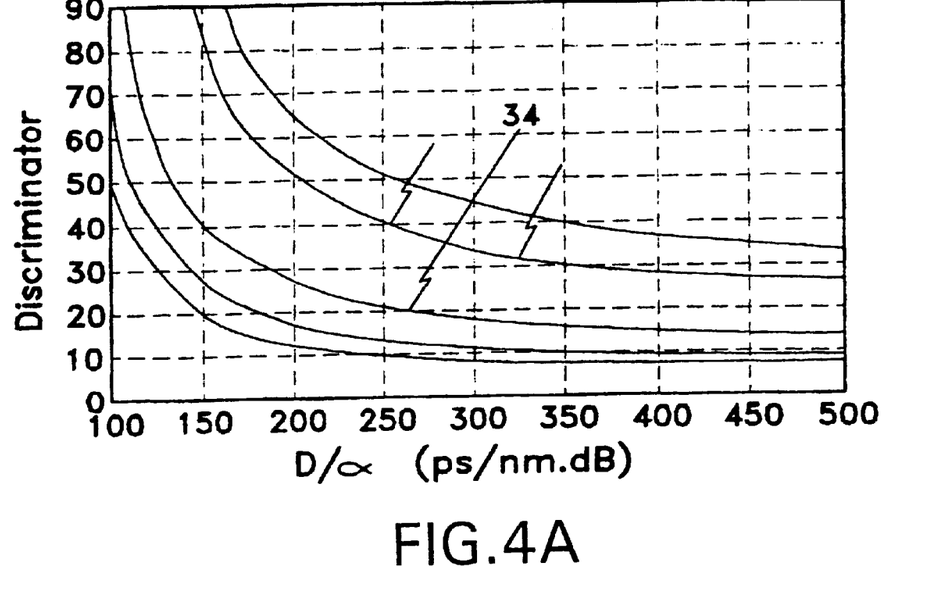
FIG. 4a shows a family of curves which relate the discriminator factor to the ratio of total dispersion and attenuation.

The non-linear discriminator factor, $G_{nl}$, defined above, is charted vs. $D_d/\alpha$ in FIG. 4a. The resulting family of curves 32 allows one to readily predict system performance, given the ratio $D_d/\alpha$. Referring to the equation for $G_{nl}$ above, it is clear that $G_{nl}$ becomes small as $D_d/\alpha$ becomes large. Thus, waveguide fiber performance, from a system point of view, can be estimated from the $D_d/\alpha$ ratio. Also, the trade off of dispersion against attenuation, in the dispersion compensating fiber can be read directly form the chart in FIG. 4a. For example, if a particular system can operate only if $G_{nl}$ is less than about 30, the dispersion of the compensating fiber can vary between −150 and −400 ps/nm-km as attenuation varies between 0.29 dB/km and 3.2 dB/km.

Figure 4B:
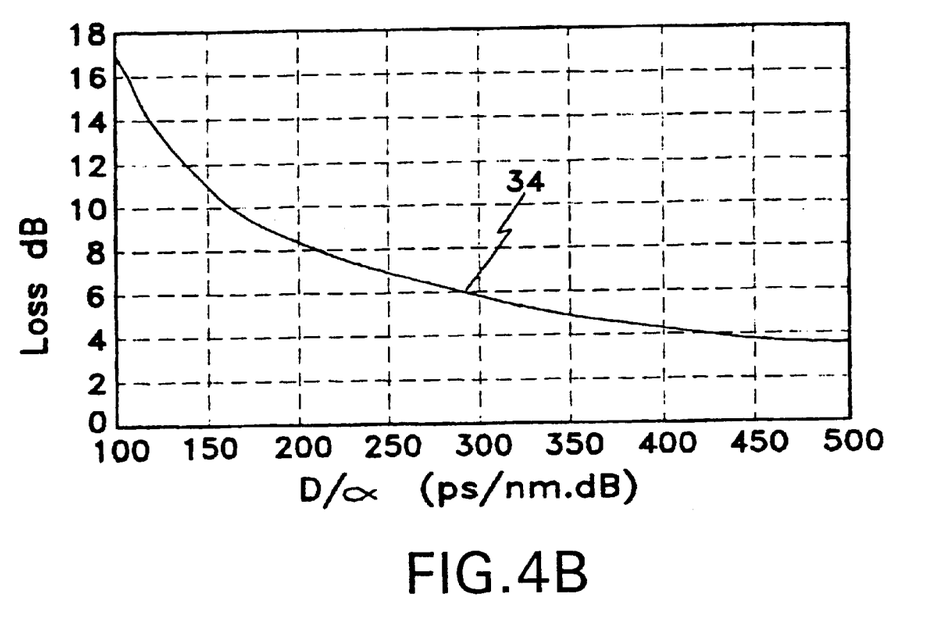
FIG. 4b shows the dependence of the system loss, introduced by the compensating waveguide fiber, on the ratio of total dispersion and attenuation.

The chart shown in FIG. 4b may also be used to evaluate the performance of a dispersion compensating waveguide fiber. The y axis is the total loss introduced into the link by the dispersion compensating waveguide fiber. The x axis is the $D_d/\alpha$ ratio. Curve 34 is drawn assuming that the original system designed for 1310 nm window operation has a length of 100 km and a dispersion at 1550 nm of 17 ps/nm-km. The dramatic improvement in contributed loss as $D_d/\alpha$ increases illustrates the value of this ratio in estimating the performance of the dispersion compensating waveguide fiber.

Although particular embodiments of the invention are disclosed and described hereinabove, the scope of the invention is nonetheless limited only by the following claims.

What is claimed is:

1. A single mode optical waveguide fiber, comprising:
   a core glass region, disposed about the axial centerline of the waveguide fiber, comprising at least three segments, each having a refractive index profile, the first segment, and having a radius, $r_1$, extending from the centerline to the point of said first segment located farthest from the centerline, and, a relative refractive index percent, $\Delta_1\%$, and additional segments, adjacent one another, extending radially outward from said first segment, having respective radii, $r_i$, extending from the centerline to the point of said ith segment located farthest from the centerline, and, relative refractive index percent, $\Delta_i\%$, i=2 to n, wherein n is the number of said segments,
   said first segment symmetrically positioned about the long axis of the optical waveguide fiber, wherein $\Delta_i\%$ is positive, and,
   at least one segment having a $\Delta_i\%$ which is negative; and,
   a clad glass layer surrounding said core glass region having a refractive index, $n_c$, which is less that the refractive index of at least a part of said core glass region;
      wherein the respective radii, $r_1$ and $r_i$, and relative refractive index percents, $\Delta_1\%$ and $\Delta_i\%$, are chosen to provide a total dispersion at 1550 nm which is negative and of a magnitude greater than about −150 ps/nm-km and a dispersion slope at 1550 which is more negative than about −1.0 ps/nm²-km.

2. The single mode optical waveguide of claim 1, wherein the relative refractive index percents, $\Delta_1\%$ and $\Delta_i\%$, are chosen to provide a dispersion slope at 1550 nm which is more negative than about −1.0 ps/nm²-km.

3. The single mode optical waveguide of claim 2, wherein the relative refractive index percents, $\Delta_1\%$ and $\Delta_i\%$, are chosen to provide a total dispersion at 1550 nm which is more negative than −200 ps/nm-km.

4. The single mode optical waveguide of claim 3, wherein the relative refractive index percents, $\Delta_1\%$ and $\Delta_i\%$, are chosen to provide a pre-selected total dispersion at 1550 nm which is more negative than −250 ps/nm-km.

5. The single mode optical waveguide of claim 3 wherein, said core glass region includes at least three segments, and the second segment has a negative Δ%.

6. The single mode optical waveguide of claim 1 wherein said core glass region includes at least three segments, and the second segment has a negative $\Delta\%$.

7. The single mode optical waveguide of claim 2 wherein said core glass region includes at least three segments, and the second segment has a negative $\Delta\%$.

8. The single mode optical waveguide of claim 4, wherein the relative refractive index percents, $\Delta_1\%$ and $\Delta_i\%$, are chosen to provide a dispersion slope at 1550 nm which is more negative than about $-2.0$ ps/nm$^2$-km.

9. The single mode fiber of claim 5 wherein the respective segments, beginning at the first segment and proceeding outwardly, having radii in the ranges of about 1 to 1.5 $\mu$m, 5 to 6.5 $\mu$m, and, 8 to 9.5 $\mu$m, and, the respective segments, beginning at the first segment and proceeding outwardly, have $\Delta\%$'s in the ranges of about 1.5 to 2.5%, $-0.2$ to $-0.5\%$, and, 0.2 to 0.5.

10. The single mode fiber of claim 6 wherein the respective segments, beginning at the first segment and proceeding outwardly, having radii in the ranges of about 1 to 1.5 $\mu$m, 5 to 6.5 $\mu$m, and, 8 to 9.5 $\mu$m, and, the respective segments, beginning at the first segment and proceeding outwardly, have $\Delta\%$'s in the ranges of about 1.5 to 2.5%, $-0.2$ to $-0.5\%$, and, 0.2 to 0.5.

11. The single mode fiber of claim 7 wherein the respective segments, beginning at the first segment and proceeding outwardly, having radii in the ranges of about 1 to 1.5 $\mu$m, 5 to 6.5 $\mu$m, and, 8 to 9.5 $\mu$m, and, the respective segments, beginning at the first segment and proceeding outwardly, have $\Delta\%$'s in the ranges of about 1.5 to 2.5%, $-0.2$ to $-0.5\%$, and, 0.2 to 0.5.

12. The single mode fiber of claim 8, wherein the respective radii, $r_1$ and $r_i$, and relative refractive index percents, $\Delta_1\%$ and $\Delta_i\%$, are chosen to provide an effective area, $A_{eff}$, at 1550 nm, no less than about 30 $\mu$m$^2$.

* * * * *

UNITED STATES PATENT AND TRADEMARK OFFICE
CERTIFICATE OF CORRECTION

PATENT NO. : 6,349,163 B1
DATED : February 19, 2002
INVENTOR(S) : A. Joseph Antos, George E. Berkey, Daniel W. Hawtof, G. Thomas Holmes and Yanming Liu It is certified that error appears in the above-identified patent and that said Letters Patent is hereby corrected as shown below:

Column 8,
Line 43, "having a refractive index, $n_c$, which is less that" should be -- having a refractive index, $n_c$, which is less than --
Line 56, "The single mode optical waveguide of claim 2" should be -- The single mode optical waveguide of claim 1 --

Column 9,
Line 1, "The single mode optical waveguide of claim 1" should be -- The single mode optical waveguide of claim 4 --
Line 4, "The single mode optical waveguide of claim 2" should be -- The single mode optical waveguide of claim 1 --

Column 10,
Line 13, "The single mode fiber of claim 8" should be -- The single mode fiber of claim 9 --

Signed and Sealed this

Twenty-fourth Day of December, 2002

JAMES E. ROGAN
*Director of the United States Patent and Trademark Office*